United States Patent
Tamilarasan et al.

(10) Patent No.: US 10,082,965 B1
(45) Date of Patent: Sep. 25, 2018

(54) INTELLIGENT SPARING OF FLASH DRIVES IN DATA STORAGE SYSTEMS

(71) Applicant: EMC Corporation, Hopkinton, MA (US)

(72) Inventors: Ashok Tamilarasan, Shrewsbury, MA (US); Ronald D. Proulx, Boxborough, MA (US); Wayne E. Garrett, Jr., Bellingham, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 49 days.

(21) Appl. No.: 15/199,729

(22) Filed: Jun. 30, 2016

(51) Int. Cl.
*G06F 12/00* (2006.01)
*G06F 3/06* (2006.01)
*G06F 11/10* (2006.01)

(52) U.S. Cl.
CPC .......... *G06F 3/0616* (2013.01); *G06F 3/0619* (2013.01); *G06F 3/0631* (2013.01); *G06F 3/0653* (2013.01); *G06F 3/0688* (2013.01); *G06F 11/1092* (2013.01); *G06F 12/00* (2013.01)

(58) Field of Classification Search
CPC ....................................................... G06F 12/00
USPC ............................................................ 711/103
See application file for complete search history.

(56) References Cited

U.S. PATENT DOCUMENTS

| | | | |
|---|---|---|---|
| 2010/0017650 A1* | 1/2010 | Chin | G06F 11/108 714/6.12 |
| 2013/0179631 A1* | 7/2013 | Cepulis | G06F 3/0616 711/103 |
| 2016/0188424 A1* | 6/2016 | Walls | G06F 11/1662 714/6.3 |

* cited by examiner

*Primary Examiner* — Gautam Sain
(74) *Attorney, Agent, or Firm* — Krishnendu Gupta; John T. Hurley (57) ABSTRACT

A method is used in managing data in a data storage system. A first set of flash drives in arranged into a redundant array of independent disks (RAID) group and a wear indicator for each of the flash drives in the first set of flash drives is determined. A second set of flash drives are configured, where the second set of flash drives are configured as spare flash drives and a wear metric is determined for each of the flash drives in the second set of flash drives. A first flash drive in the first set of flash drives that is to be replaced is identified. A spare flash drive from the second set of flash drives is selected, where the spare flash drive is selected based on a wear metric. A rebuild process is initiated where the first flash drive is replaced with the selected spare flash drive.

5 Claims, 7 Drawing Sheets

INTELLIGENT SPARING OF FLASH DRIVES IN DATA STORAGE SYSTEMS

BACKGROUND

Technical Field

This application relates to managing flash drive spares in data storage systems.

Description of Related Art

A traditional storage array (herein also referred to as a "disk storage array", "disk array", or simply "array") is a collection of hard disk drives operating together logically as a unified storage device. Storage arrays are designed to store large quantities of data. Storage arrays typically include one or more storage array processors (SPs), for handling both requests for allocation and input/output (I/O) requests. An SP is the controller for and primary interface to the storage array.

Storage arrays are typically used to provide storage space for one or more computer file systems, databases, applications, and the like. For this and other reasons, it is common for storage arrays to logically partition a set of disk drives into chunks of storage space, called logical units, or LUs. This enables a unified storage array to provide the storage space as a collection of separate file systems, network drives, and/or Logical Units.

Performance of a storage array may be characterized by the array's total capacity, response time, and throughput. The capacity of a storage array is the maximum total amount of data that can be stored on the array. The response time of an array is the amount of time that it takes to read data from or write data to the array. The throughput of an array is a measure of the amount of data that can be transferred into or out of (i.e., written to or read from) the array over a given period of time.

The administrator of a storage array may desire to operate the array in a manner that maximizes throughput and minimizes response time. In general, performance of a storage array may be constrained by both physical and temporal constraints. Examples of physical constraints include bus occupancy and availability, excessive disk arm movement, and uneven distribution of load across disks. Examples of temporal constraints include bus bandwidth, bus speed, spindle rotational speed, serial versus parallel access to multiple read/write heads, and the size of data transfer buffers.

One factor that may limit the performance of a storage array is the performance of each individual storage component. A storage system may include a variety of storage devices that balance performance and cost objectives. Different types of disks may be arranged whereby the like kinds of disks are grouped into tiers based on the performance characteristics of the disks.

For example, a fast tier (also referred to as "higher tier" or "high tier") may include a group of very fast solid state drives (SSDs) used to store a relatively small amount data that is frequently accessed. A medium tier (also referred to as "mid-tier" or "middle tier") may include a group of fast hard disk drives (HDD) used to store a larger amount of less frequently accessed data but at a lower performance level that SSDs. A slow tier (also referred to as "lower tier" or "low tier") may include a group of slower HDDs used to store very large amounts of data with a still lower level of performance as compared to SSDs and fast HDDs. It may be possible to have different tiers with different properties or constructed from a mix of different types of physical disks to achieve a performance or price goal. Storing often frequently, or hot, data on the fast tier and less frequently referenced, or cold, data on the slow tier may create a more favorable customer cost/performance profile than storing all data on a single kind of disk. To provide data protection, tiers may be arranged in a variety RAID (Redundant Array of Independent or Inexpensive Disks) configurations known in the art.

A variety of different technologies may be used in connection with data storage. Data may be stored on disk devices (as described above), tape devices and flash memory devices, such as flash drives. Different storage technologies, such as a flash memory device, may fail primarily due to wear out or usage, such as after performing a certain number of write cycles to store data on the flash memory device. For example, flash memory devices that uses SLC (single level cell) NAND technology are expected to perform a specified number of writes to each cell. After performing the specified number of writes to a particular cell, that cell can be expected to fail at any time thereafter. In recognition of this fact, different techniques may be used when writing to the flash memory device. For example, error correction code (ECC) may be used to allow recovery of data upon the occurrence of a write failure.

Another technique is wear leveling which attempts to evenly distribute writes across cells within a physical device. Wear leveling may be transparent to the user. Hence, when performing a write operation to a flash memory device, the write operation may be performed to a logical location on the device which is then mapped to a physical location within the device. When using wear leveling with flash memory devices, the particular physical location for the same logical location may change in accordance with a mapping of virtual to physical locations in order to achieve the desired equal distribution of writes across physical locations within the device. While wear leveling can be employed within a device, writes to, for example, multiple flash drives may not be equally distributed. Consequently, some drives may reach the specified number of write cycles before other flash drives resulting in earlier than expected failure for such drives. Such early failures can increase Total Cost of Ownership in addition to the inconvenience of replacing the failed drives.

SUMMARY OF THE INVENTION

A method is used in managing data in a data storage system. A first set of flash drives in arranged into a redundant array of independent disks (RAID) group and a wear indicator for each of the flash drives in the first set of flash drives is determined. A second set of flash drives are configured, where the second set of flash drives are configured as spare flash drives and a wear metric is determined for each of the flash drives in the second set of flash drives. A first flash drive in the first set of flash drives that is to be replaced is identified. A spare flash drive from the second set of flash drives is selected, where the spare flash drive is selected based on a wear metric. A rebuild process is initiated where the first flash drive is replaced with the selected spare flash drive.

BRIEF DESCRIPTION OF THE DRAWINGS

Features and advantages of the present invention will become more apparent from the following detailed description of example embodiments thereof taken in conjunction with the accompanying drawings in which.

DETAILED DESCRIPTION OF EMBODIMENT(S)

Data storage systems may include different types of storage devices, such as Flash drives and hard disk drives. Flash drives are typically specified as having an expected lifetime (e.g., as measured in an amount of actual elapsed time such as a number of years, months, and/or days) based on a number of guaranteed write cycles and a rate or frequency at which the writes are performed. Thus, a flash drive may be expected to have a usage measured in calendar or wall clock elapsed time based on the amount of time it takes to perform the number of guaranteed write cycles. Alternatively, drive wear may also be expressed as the percentage of program erase (PE) cycles performed vs. the total number PE cycles a flash drive can be expected to perform as specified by the drive manufacturer. As discussed in more detail below, the techniques described herein may be used to match a failed or degraded drive wear with the wear of the RAID group the spare is being installed to. When a drive fails, the technique examines wear level of all the spares and selects the appropriate spare instead of just randomly choosing a spare disk. Further, drives of different endurances may be mixed such that they do not need to be the same as the endurance as the drives of the RAID group being rebuilt. This can reduce maintenance and total operating cost by reducing the number of spares necessary to ensure reasonable backup protection. By contrast, current techniques randomly chose spares when replacing a failed drive and, in addition, much have the same endurance as the drives in the RAID group being rebuilt.

Figure 1:
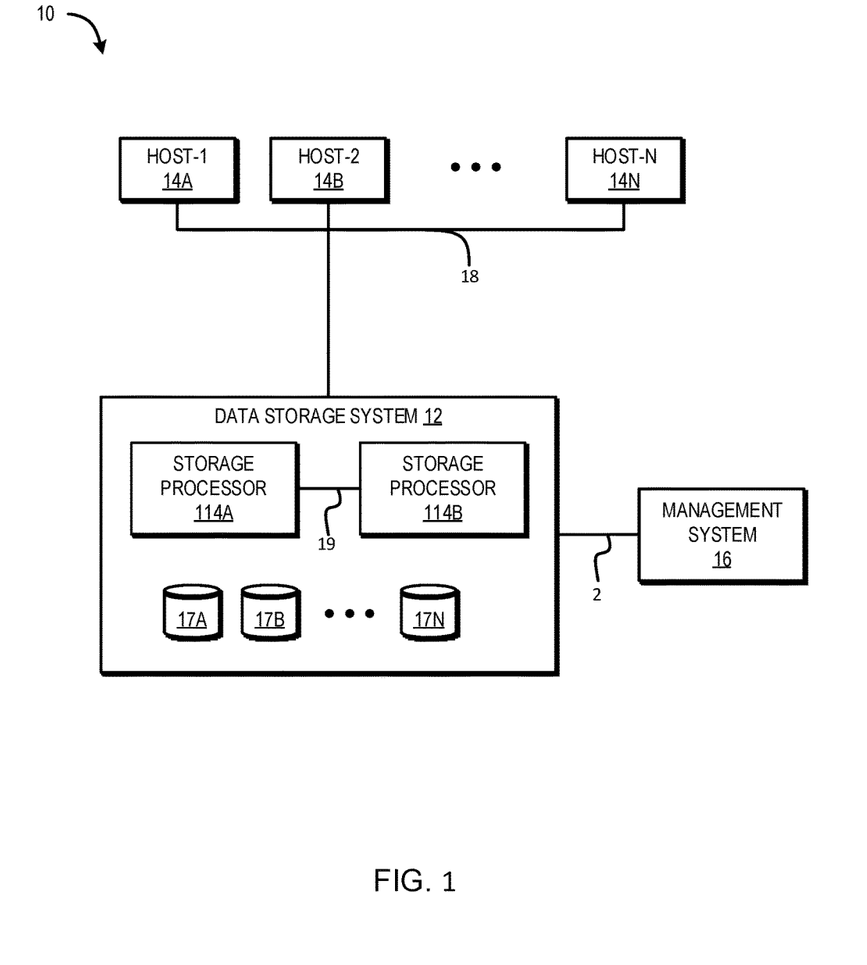
FIG. 1 is an example embodiment of a system that may utilize the techniques described herein.

FIG. 1 depicts an example embodiment of a system that may be used in connection with performing the techniques described herein. The system 10 includes one or more data storage systems 12 connected to server or host systems 14a-14n through communication medium 18. The system 10 also includes a management system 16 connected to one or more data storage systems 12 through communication medium 2. In this embodiment of the system 10, the management system 16, and the N servers or hosts 14a-14n may access the data storage systems 12, for example, in performing input/output (I/O) operations, data requests, and other operations. The communication medium 18 may be any one or more of a variety of networks or other type of communication connections as known to those skilled in the art. Each of the communication mediums 18 and 2 may be a network connection, bus, and/or other type of data link, such as a hardwire or other connections known in the art. For example, the communication medium 18 may be the Internet, an intranet, network or other wireless or other hardwired connection(s) by which the host systems 14a-14n may access and communicate with the data storage systems 12, and may also communicate with other components (not shown) that may be included in the system 10. In one embodiment, the communication medium 2 may be a LAN connection and the communication medium 18 may be an iSCSI, Fibre Channel, Serial Attached SCSI, or Fibre Channel over Ethernet connection.

Each of the host systems 14a-14n and the data storage systems 12 included in the system 10 may be connected to the communication medium 18 by any one of a variety of connections as may be provided and supported in accordance with the type of communication medium 18. Similarly, the management system 16 may be connected to the communication medium 2 by any one of variety of connections in accordance with the type of communication medium 2. The processors included in the host computer systems 14a-14n and management system 16 may be any one of a variety of proprietary or commercially available single or multi-processor system, such as an Intel-based processor, or other type of commercially available processor able to support traffic in accordance with each particular embodiment and application.

It should be noted that the particular examples of the hardware and software that may be included in the data storage systems 12 are described herein in more detail, and may vary with each particular embodiment. Each of the host computers 14a-14n, the management system 16 and data storage systems may all be located at the same physical site, or, alternatively, may also be located in different physical locations. In connection with communication mediums 18 and 2, a variety of different communication protocols may be used such as SCSI, Fibre Channel, iSCSI, and the like. Some or all of the connections by which the hosts, management system, and data storage system may be connected to their respective communication medium may pass through other communication devices, such as switching equipment that may exist such as a phone line, a repeater, a multiplexer or even a satellite. In one embodiment, the hosts may communicate with the data storage systems over an iSCSI or a Fibre Channel connection and the management system may communicate with the data storage systems over a separate network connection using TCP/IP. It should be noted that although FIG. 1 illustrates communications between the hosts and data storage systems being over a first connection, and communications between the management system and the data storage systems being over a second different connection, an embodiment may also use the same connection. The particular type and number of connections may vary in accordance with particulars of each embodiment.

Each of the host computer systems may perform different types of data operations in accordance with different types of tasks. In the embodiment of FIG. 1, any one of the host computers 14a-14n may issue a data request to the data storage systems 12 to perform a data operation. For example, an application executing on one of the host computers 14a-14n may perform a read or write operation resulting in one or more data requests to the data storage systems 12.

The management system 16 may be used in connection with management of the data storage systems 12. The management system 16 may include hardware and/or software components. The management system 16 may include one or more computer processors connected to one or more I/O devices such as, for example, a display or other output device, and an input device such as, for example, a keyboard, mouse, and the like. A data storage system manager may, for example, view information about a current storage volume configuration on a display device of the management system 16, provision data storage system resources, and the like.

In one embodiment, the data storage systems 12 may include one or more data storage systems such as one or more of the data storage systems, such as data storage arrays, offered by EMC Corporation of Hopkinton, Mass. Each of the data storage systems may include one or more data storage devices 17a-17n. Unless noted otherwise, data storage devices may be used interchangeably herein to refer to hard disk drive, solid state drives, and/or other known storage devices. One or more data storage systems may be manufactured by one or more different vendors. Each of the data storage systems included in 12 may be inter-connected (not shown). Additionally, the data storage systems may also be connected to the host systems through any one or more communication connections that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by the host computer systems, for example, to the data storage systems 12. It should be noted that each of the data storage systems may operate stand-alone, or may also be included as part of a storage area network (SAN) that includes, for example, other components such as other data storage systems. Each of the data storage systems may include a plurality of storage devices 17a-17n. The particular data storage systems and examples as described herein for purposes of illustration should not be construed as a limitation. Other types of commercially available data storage systems, as well as processors and hardware controlling access to these particular devices, may also be included in an embodiment.

In such an embodiment in which element 12 of FIG. 1 is implemented using one or more data storage systems, each of the data storage systems may include code thereon for performing the techniques as described herein.

Servers or host systems, such as 14a-14n, provide data and access control information through channels to the storage systems, and the storage systems may also provide data to the host systems also through the channels. The host systems may not address the disk drives of the storage systems directly, but rather access to data may be provided to one or more host systems from what the host systems view as a plurality of logical devices or logical volumes (LVs). The LVs may or may not correspond to the actual disk drives. For example, one or more LVs may reside on a single physical disk drive. Data in a single storage system may be accessed by multiple hosts allowing the hosts to share the data residing therein. An LV or LUN (logical unit number) may be used to refer to the foregoing logically defined devices or volumes.

The data storage system may be a single unitary data storage system, such as single data storage array, including two storage processors or compute processing units. Techniques herein may be more generally use in connection with any one or more data storage system each including a different number of storage processors than as illustrated herein. The data storage system 12 may be a data storage array, such as a VNX® data storage array by EMC Corporation of Hopkinton, Mass., including a plurality of data storage devices 17a-17n and two storage processors 114A, 114B. The storage processors 114A, 114B may include a central processing unit (CPU) and memory and ports (not shown) for communicating with one or more physical or virtual hosts 14A-14N. The storage processor may be communicatively coupled via a communication medium such as storage processor bus 19. The storage processor units may be included in the data storage system 12 for processing requests and commands. In connection with performing techniques herein, an embodiment of the data storage system may include multiple storage processors including more than two storage processors as described. The VNX® data storage system mentioned above may include two storage processors 114A, 114B for performing processing in connection with servicing requests. Additionally, the two storage processors 114A, 114B may be used in connection with failover processing when communicating with the management system 16. Client software on the management system 16 may be used in connection with performing data storage system management by issuing commands to the data storage system 12 and/or receiving responses from the data storage system 12 over connection 2. In one embodiment, the management system 16 may be a laptop or desktop computer system.

The particular data storage system as described in this embodiment, or a particular device thereof, such as a disk, should not be construed as a limitation. Other types of commercially available data storage systems, as well as processors and hardware controlling access to these particular devices, may also be included in an embodiment.

Figure 2:
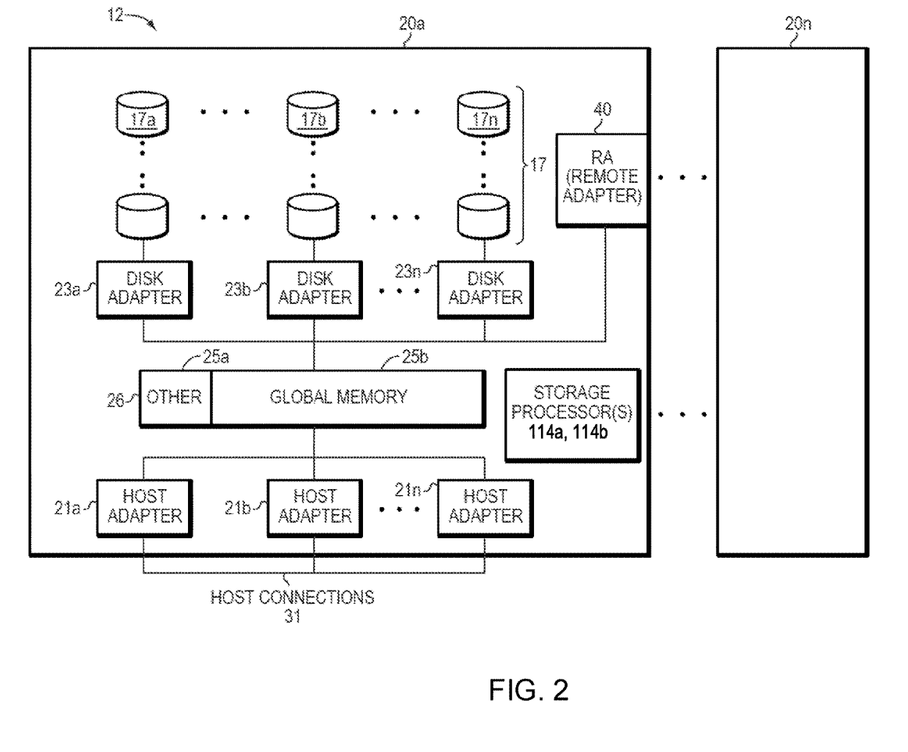
FIG. 2 is a diagram illustrating in more detail components of FIG. 1 that may be used with the techniques described herein.

FIG. 2 illustrates an example of components of data storage system 12 that may be included in the system 10 of FIG. 1. The data storage system 12 of FIG. 2 includes one or more data storage systems 20a-20n as may be manufactured by one or more different vendors as noted above. Each of the data storage systems 20a-20n may be a data storage array inter-connected (not shown) to other data storage array(s). Additionally, as noted above, the data storage systems may also be connected to the host systems through any one or more communication connections 31. In this example, reference is made to the more detailed view of element 20a. It should be noted that a similar more detailed description may also apply to any one or more of the other elements, such as 20n, but have been omitted for simplicity of explanation.

Each of the data storage systems, such as 20a, may include a plurality of storage devices such as disk devices or volumes included in an arrangement 17 consisting of n rows or shelves of disks or more generally, data storage devices, 17a-17n. In this arrangement, each row of disks may be connected to a disk adapter ("DA") or director responsible for the backend management of operations to and from a portion of the disks 17. In the system 20a, a single DA, such as 23a, may be responsible for the management of a row of disks. In a data storage system such as by EMC Corporation of Hopkinton, Mass., a backend DA may also be referred to as a disk controller. The DA may perform operations such as reading data from, and writing data to, the physical devices which are serviced by the DA.

The system 20a may also include one or more storage processors 114a, 114b. Each of the storage processors 114a, 114b may be CPU and an embodiment may include any number of such processors. For example, the data storage system may include two storage processors. The system 20a may also include one or more host adapters ("HAs") or directors 21a 21n. Each of the HAs may be used to manage communications and data operations between one or more host systems and global memory. In an embodiment, the HA may be a Fibre Channel Adapter (FA) or other adapter which facilitates host communication. The HA communicates with a component of the host such as a host bus adapter (HBA). Generally, directors may also be characterized as the different adapters, such as HAs (including FAs), DAs RAs and the like, as described herein. Components of the data storage system, such as an HA, which may communicate with a host may also be referred to as front end components. Within the data storage system, components, which may be characterized as backend components, communicate with a front end component. An example of a backend component is a DA. In connection with data storage systems, various types of directors or adapters may be implemented as a processor, or, more generally, a component that includes the processor. Examples of directors are disk adapters (DAs), host adapters (HAs), remote adapters (RAs) and the like. A remote adapter 40 (RAs) may be hardware including a processor used to facilitate communication between data storage systems, such as between two of the same or different types of data storage systems.

One or more internal logical communication paths may exist between the DAs, the RAs, the HAs, and the memory 26. An embodiment, for example, may use one or more internal busses and/or communication modules. For example, the global memory portion 25b may be used to facilitate data transfers and other communications between the DAs, HAs and RAs in a data storage system. In one embodiment, the DAs 23a-23n may perform data operations using a cache that may be included in the global memory 25b, for example, in communications with other disk adapters or directors, and other components of the system 20a. The other portion 25a is that portion of memory that may be used in connection with other designations that may vary in accordance with each embodiment.

The particular data storage system as described in this embodiment, or a particular device thereof, such as a disk, should not be construed as a limitation. Other types of commercially available data storage systems, as well as processors and hardware controlling access to these particular devices, may also be included in an embodiment.

Figure 3:
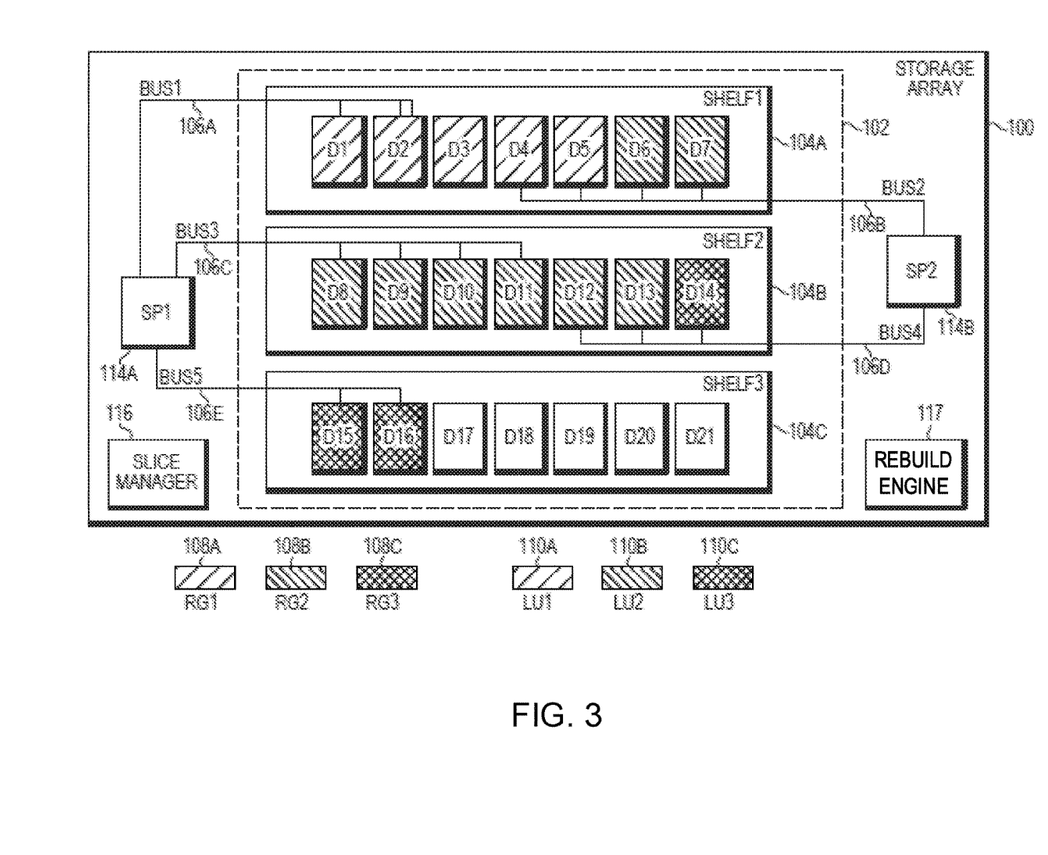
FIG. 3 is a diagram illustrating in more detail components of FIG. 1 that may be used with the techniques described herein.

FIG. 3 illustrates a storage array 100 that may include multiple storage devices 102, which are hard disk drives such as serial attached SCSI (SAS) drives, Fibre Channel (FC) Drives, serial advanced technology attachment (SATA) drives flash drives, or some combination of the above. In one embodiment, storage devices 102 may be organized into multiple shelves 104, each shelf containing multiple storage devices. In the embodiment illustrated in FIG. 3, storage array 100 includes three shelves, Shelf1 104A, Shelf2 104B, and Shelf3 104C, each containing seven storage devices, D1-D21. In one embodiment, each storage device 102 may be dual ported devices and connected to each storage process via independent buses 106. In the embodiment illustrated in FIG. 3, each shelf 104 has two buses 106, each of which connects to every device 102 on shelf 104. For example, Shelf1 104A has two buses, Bus1 106A and Bus2 106B, where Bus1 106A is connected to devices D1-D7 and Bus2 106B is also connected to devices D1-D7. Similarly, Shelf2 104B has two buses, Bus3 106C and Bus4 106D, where Bus3 106C is connected to devices D8-D14 and Bus4 106D is connected to devices D8-D14. Lastly, Shelf3 104C has one bus, Bus5 106E, where Bus5 106E is connected to devices D15-D21. It may be appreciated that the configuration of storage array 100 as illustrated in FIG. 3 is for illustrative purposes only and is not to be considered a limitation of the subject matter described herein.

In addition to the physical configuration, storage devices 102 may also be logically configured. For example, multiple storage devices 102 may be organized into redundant array of independent disks (RAID) groups, or RGs 108, shown in FIG. 3 being differently shaded as RG1 108A, RG2 108B, and RG3 108C. Storage devices D1-D5 are shown organized into a first RAID group, RG1 108A, while storage devices D6-D13 are organized into a second RAID group, RG2 108B, and storage devices D14-D16 are organized into a third RAID group, RG3 108C. In one embodiment, a RAID group may span multiple shelves and/or multiple buses. Although RAID groups are composed of multiple storage devices, a RAID group may be conceptually treated as if it were a single storage device.

Storage devices 102 may be managed by one or more storage processors 114. Storage processors (SPs) 114 may be responsible for allocating storage and maintaining information about how that allocated storage is being used; maintaining the map may be done by the storage processors. Storage processors 114 may maintain information about the structure of the file system whose contents are being stored in the allocated slices. For example, SP1 114A may be connected to bus1 106A, bus3 106C, and bus5 106E for managing disks D1-D3, D8-D11, and D15-D16. Similarly, SP2 114B may be connected to bus2 106B, and bus4 106D for managing disks D41-D7, and D12-D14. It may be appreciated that multiple SPs can manage all disks/buses at the same time but may coordinate with each other.

In addition to RAID groups, each logical unit 110 may be further subdivided into slices (not shown). In the embodiment illustrated in FIG. 3, RG1 108A/LU1 110A may be divided into multiple slices that may be allocated, de-allocated, re-allocated, reserved, or relocated by slice manger 116. A slice may be, for example, a 1 GB slice of data. However, the techniques described herein should not be construed as being limited to only slices of data; the techniques are equally applicable to other data chunk sizes, such as blocks, slivers (subset of slices), page, file and the like.

Slice manager 116 may be a software application or layer that is executed, at least in part, by one or more SPs 114. Slice manager 116 may be responsible for implementing a slice allocation policy. For example, slice manager 116 may receive slice allocation requests, service slice allocation requests, and maintain relevant statistical information regarding slices. It may be appreciated that spreading data across multiple disk drives in an array allows for data to be read from the drives in parallel, increasing I\O performance.

In the event a drive associated with a RAID group becomes unavailable, data for the drive may need to be rebuilt. For example, employing techniques described herein, a drive may be temporarily removed and reinserted a short time later either in the same slot or a different slot in the same or different shelf 104. Data that was written to the drive while it was removed from the storage array may be rebuilt via a rebuild engine 117. As will be described in more detail below, the rebuild engine 117 may create and/or maintain a rebuild bitmap that may track sectors that would have been written to on the removed drive. If the drive is reinserted within a predetermined time period, the rebuild engine 117 may initiate a rebuild such that only the differential data is rebuilt, thereby dramatically reducing the rebuild time.

Figure 4:
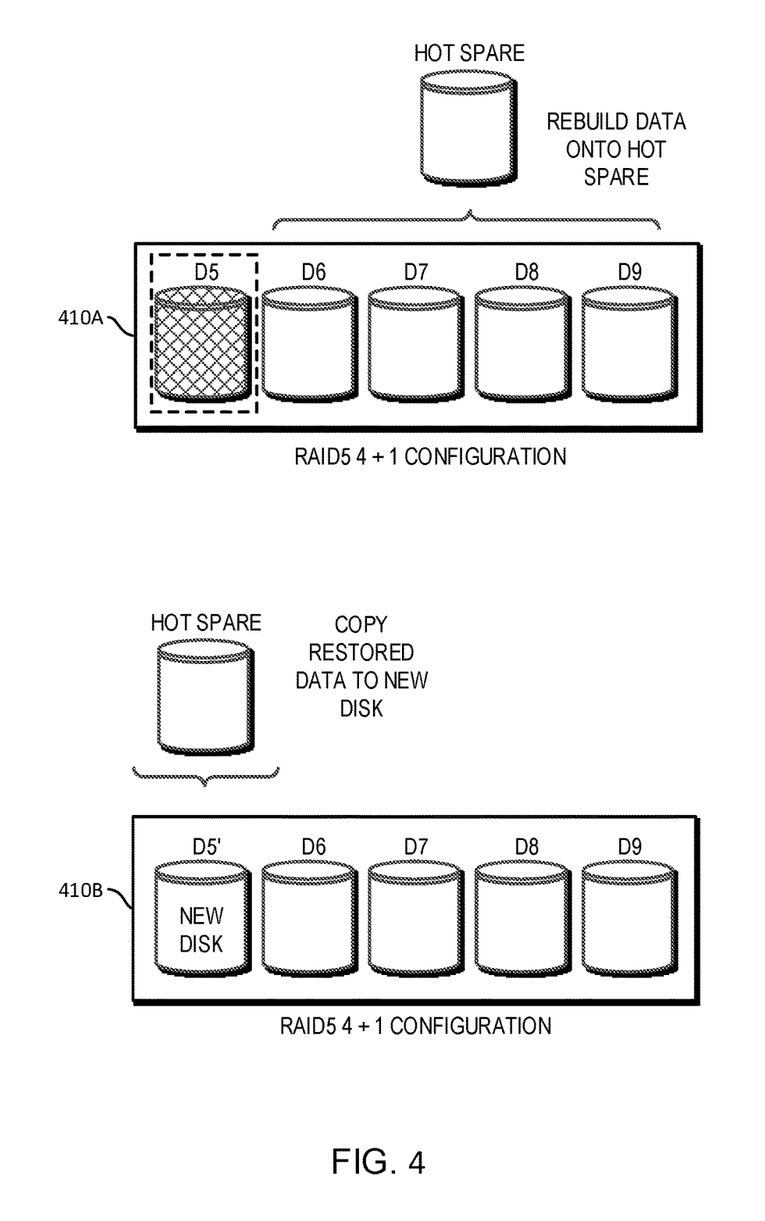
FIG. 4 is a diagram illustrating a device rebuild procedure.

FIG. 4 illustrates a conventional method of rebuilding a drive in the event that drive is, for example, removed from the storage system or otherwise becomes unavailable. When a storage device in the data storage system is removed, a conventional restore and repair process, such as that shown in FIG. 4, may be employed. For example, when a RAID's 410 drive D5 is removed or otherwise unavailable, data stored on the unavailable drive is immediately rebuild onto a "hot spare" drive using parity information stored on the RAID's other remaining drives D6-D9. In this case, data is read, in a physically linear fashion, starting at logical block address 0 and continuing to the last logical block on the drive. Data is reconstructed, and then written to the hot spare so configured for that particular RAID group. The hot spare is the same type of hard disk drive and has a capacity equal to that of the largest drive in the RAID group. Thus, drives are mapped on a one-to-one basis and cannot be different types (e.g., cannot migrate from SAS RAID-5 to EFD RAID-6). Thereafter, the failed disk drive D5 is replaced and a new drive D5' is installed in the same slot, and an equalize process is performed where the restored data is copied from the hot spare back onto the newly replaced drive D5' in the corresponding RAID group 410B. Then, the hot spare is once again made available as a hot spare for its associated RAID group. Thus, data is effectively processed twice: first for the rebuild process and second for the equalize process.

During the rebuild time, the data storage system's performance is degraded. For example, the amount of time it takes for an application to retrieve data during the rebuild process can increase significantly, in part because they data storage system is trying to satisfy at least two tasks: rebuilding the failed drive's data and servicing application data requests (data which may also need to be reconstructed). Furthermore, some system architectures may cause data to become unavailable the moment the storage system becomes degraded (e.g., as required under certain data service level agreements).

The likelihood of irretrievable data loss is also increased during the rebuild time. For example, depending in the RAID type, should a second drive fail, parity data necessary for reconstructing data stored on the first failed drive will be lost, thereby preventing total data recovery resulting in permanent data loss. In addition, drive errors on any remaining drives that may not have been an issue because of redundancy can also cause data loss.

Storage capacity of various storage elements continues to grow at an ever increasing rate. The time it takes the rebuild process to complete is directly proportional to the size of the storage element, and, thus, rebuild time is increasing as drive capacity increases. Consequently, as storage capacity increases so too does the time a RAID group remains in a degraded mode as well as the amount of time data remains as risk.

Figure 5:
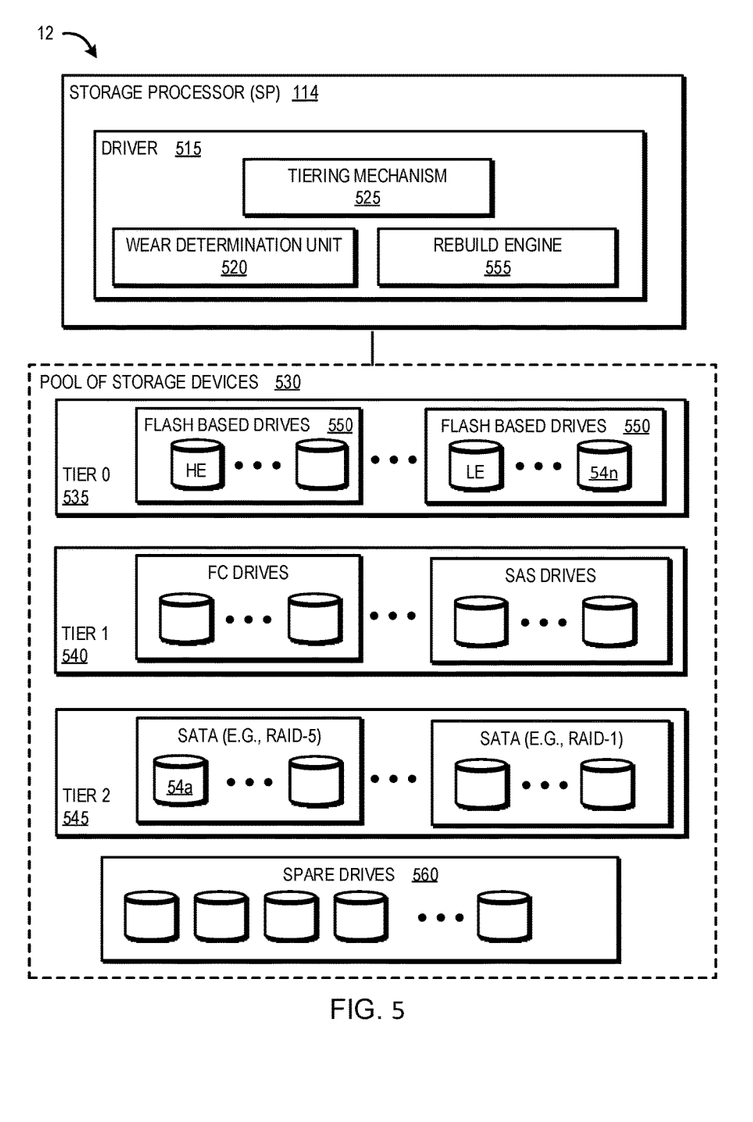
FIG. 5 is a diagram illustrating in more detail components of FIG. 1 that may be used with the techniques described herein.

Referring to FIG. 5, shown is a more detailed representation of components that may be included in an example embodiment using the techniques described herein. In the example, a data storage system 12 may include a pool of storage devices that includes a variety of disks 54a-n accessed by logical volumes as described above. The data storage system 12 may also include storage processors 114 and related processing circuitry having a driver 515 that operates in accordance with and/or helps implement a wear determination unit 520, a tiering mechanism 525, and a drive rebuild engine 555. The driver 515 may be part of, work in conjunction with, or independent of the wear determination unit 520, rebuild engine 555 and/or the tiering mechanism 525. As described in more detail below, one or more of the disks 54a-n in a RAID group may include SSD drives of one or more performances classes such as high endurance, medium endurance, and low endurance and read intensive drives that operate in a similar manner as flash drives described elsewhere herein.

The pool storage devices 530 include a number of different types of storage devices having different performance/cost characteristics. The storage devices can be grouped together with like type devices to form a particular RAID configuration (e.g., RAID-5, RAID-1, etc.). The RAID groups may be designated as belonging to one of multiple tiers 535, 540, 545, where the tiers are categorized according to their corresponding performance characteristics. For example, tier 0 535, comprising SSD drives is the highest performing tier, tier 1 540, comprising FC and/or SAS drives, may be the next highest performing tier, and tier 2 545, comprising SATA drives, may be a lower performing tier. It should be noted that, different RAID group types can be group together in the same tier. For example, tier 2 may include RAID-1, RAID-5, RAID-6, and RAID-10 configurations. Also shown are spare drives 560 that may be used to swap out failed drives using a rebuild technique that will be explained below in further detail.

As known in the art, writing to a flash drive includes performing a first operation to erase any existing data and then a second operation to write the new data to be stored. Although descriptions herein may be made to performing a write operation to the flash drive for purposes of simplification in description, it will be appreciated that performing write operations to flash drives as described herein implies performing both the necessary erasure operation and write operation for writing data to the flash drive. Additionally, in connection with the foregoing, for examples described herein regarding flash drives, wear out or usage may be expressed as being dependent on a number of write operations performed although the wear out or usage is actually caused by performing the implied erasure operation in order to effect the subsequent write operation to record or write new data to the flash drive. Thus, description herein for flash drives referring to wear out or usage based on a number of write operations implies the wear out or usage in accordance with the implied erasure operation necessary to effect the subsequent writing of the new data. In connection with obtaining a measurement regarding wear out or usage, the number of erasures or write operations may be used interchangeably.

It should be noted that an embodiment may use techniques herein with a flash drive that performs writes to a group or portion of cells of the device, such as a block of cells. Thus, when writing to the flash drive, a number of writes may be performed at a time in accordance with a number of cells in each block. For example, a write operation to store new data to a flash drive may write to a block of cells in which each block stores 128 kB (kilobytes) of data so that a single erase and write sequence of operations may be performed to write 128 kB of data as a unit to the block.

Continuing with FIG. 5, the wear determination unit 520 may be configured to determine a wear indicator or metric for an SSD drive by monitoring the erasure count for the drive. This information may be obtained and/or stored in wear indicator map maintained by the SP. An embodiment may collect statistics on a number of writes to a drive by, for example, counting the number of erasures performed on the drive. This may be performed continuously or over a particular span of time. In addition to the current number of writes, other metrics such as total number of lifetime writes, and the number of hours powered on may also be collected or determined. The foregoing information may then be used to compute statistics regarding a total number, as well as how frequently, a drive is written to. Flash drives typically have a specified lifetime rating based on the total number of writes. A ratio may be derived using a drive's current number of write cycles and its total rated write count to calculate the percentage of writes performed, which may be viewed as a write utilization metric that may be expressed as a percentage, for example. Alternatively, or in addition, the number of writes remaining may be determined by subtracting the current write count from the total or "end of life" (EOL) count. The time remaining (e.g., time in days, weeks, etc.) at which EOL will be reach. This information can be analyzed to identify flash drives that may be in danger of failing as they approach their end of life rating (i.e., as they approach 100% write utilization).

The tiering mechanism 525 may be configured to migrate data to the most appropriate tier based on a metric such as temperature. As discussed herein, temperature for a data object (e.g., data slice) can be determined based on the data's activity, i.e., how often the data is accessed. Thus, hot data may be migrated to faster storage (e.g., flash drive), cold data is migrated to slower storage (e.g., hard disk drive), and warm data may be migrated to either faster or slower storage, depending on, for example, the warm data's absolute temperature and available storage space. Migration may be accomplished by copying the data and changing the map entries for the logical addressed that were involved to reflect the new logical to physical association.

Each tier, such as tier 0, may be created by specifying a tier definition (not shown). The tier definition may include one or more lines of text in a language which may be subsequently processed by code on the data storage system. The tier definition defines a tier indicated by a name value. The tier definition may include one or more clauses which may include one or more goal clauses and/or one or more configuration clauses.

In one example embodiment, the rebuild engine 555 may be configured to rebuild data stored in a RAID configuration based on a wear metric in conjunction with the wear determination unit 520. For example, a fast tier 535 may comprise multiple flash drives 550. For the multiple flash drives, a wear indicator for each drive may be determined based on the respective drive's total lifetime erasure count. With this information, a metric for the entire RAID group, such as the average wear for all active drives in the RAID group may be determined. Drives having lower erasure counts may be considered as having a low wear level, and thus can be expected to have a projected longer life than high wear level drives. Drives in a particular tier may be rank ordered to sort drives according to wear level. Spare drives 560 may be similar analyzed to determine a wear metric for each spare. As a result, when selecting a spare drive to replace a failed drive, the spare can be matched to the destination RAID group based on one or more particular criteria or policies.

Figure 6:
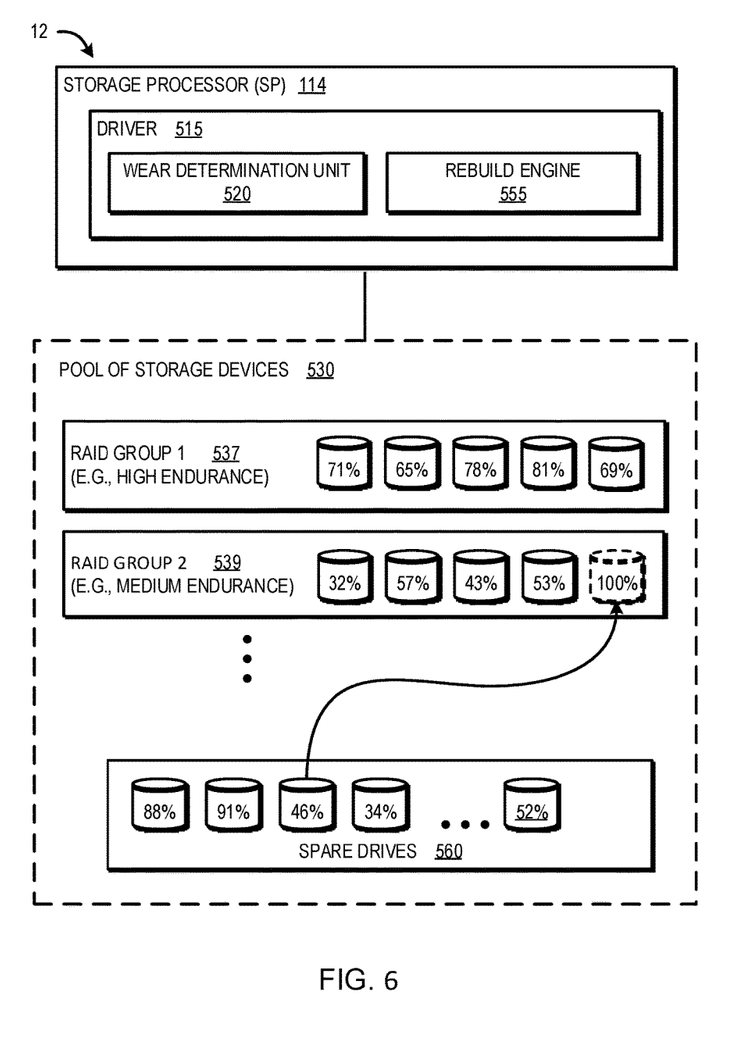
FIG. 6 is a diagram illustrating in more detail components of FIG. 1 that may be used with the techniques described herein.
Figure 7:
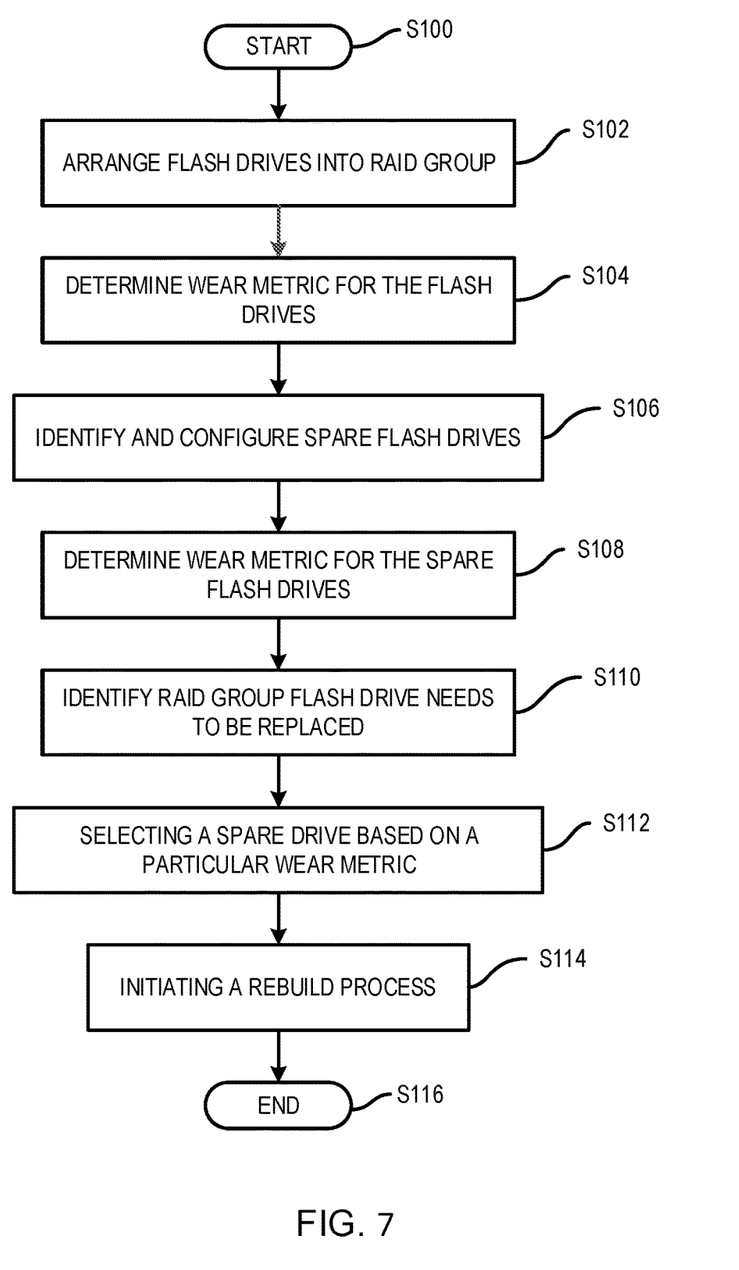
FIG. 7 is a flow diagram illustrating a process that may be used in connection with techniques described herein.

Referring to FIG. 6, shown is a more detailed representation of components that may be included in example embodiments implementing a rebuild mechanism that selects a spare SSD drive based on wear attributes of the spare drive and corresponding destination RAID group. In the example, a data storage system 12 may include disks accessed by logical volumes as described above.

In the example, a data storage system 12 may include a pool of storage devices 530 that includes a variety of disks accessed by logical volumes as described above. The data storage system 12 may also include storage processors 114 and associated processing circuitry having a driver 515 that operates in accordance with and/or helps implement a wear determination unit 520 and/or a rebuild engine 555, and volatile and flash-based memory cache (not shown). The driver 515 may be part of, work in conjunction with, or independent of the wear determination unit 520 and the rebuild engine 555.

The pool storage 530 devices include a number of different types of storage devices having different performance/cost characteristics. The storage devices can be grouped together based on performance. Groups of similar types of storage devices can be arranged into multiple RAID groups 537, 539 that are categorized according to their corresponding performance characteristics. In the example, the RAID groups 537, 539 that are illustrated are groups having flash drives. The RAID groups may, at least initially, be arranged into one or more groups such that they comprise a particular class of flash drives. For example, a first RAID group may include high endurance SSD drives, a second RAID group may include medium endurance SSD drives, a third RAID group may include low endurance SSD drives, and a fourth RAID group may include read intensive SSD drives.

In a manner similar to that as described above, the wear determination unit 520 may be configured to determine a wear indicator for each flash drive by monitoring the erasure count for the drive. This information may be obtained and/or stored in wear indicator map maintained by the SP. An embodiment may, for example, collect statistics on a number of writes to a drive such as by counting the number of erasures performed on the drive. Additional information may be collected including a specified total number of erasures a drive is rated for and the total number of hours a drive has been in operation. The foregoing information may then be used to compute statistics regarding a total number of times, as well as how frequently (i.e., the rate), a drive is written to. For example, a percentage of write cycles performed (or put another way, percentage of drive life consumed) can be calculated using the current write cycle count and the drive's specified total write cycle count to determine drive write utilization. This information can be analyzed to identify, for example, the individual and average wear rate for a particular RAID group.

The technique is also applied to spare SSD drives associated with a spare drive pool 560. The spare drive pool 560 may be a pool of flash drives of different classes (e.g., high, medium, low, etc. endurance) and may or may not include HDD drives as well. When first installed, a new, unused spare SSD drive will obviously have a very low utilization rate. However, as RAID groups are built and destroyed, previously used, but still operational, SSD drives may be taken out of service and repurposed as a spare SSD drive. Thus, over time, the utilization rate of available spares can vary significantly.

In various example embodiments, a data activity type may be determined in a number of different ways. For example, data type may be determined for every read/write or for a subset of read/writes. The activity type may be determined in real-time, periodically, sampled, or event driven by, for example, a data storage system or server. A tool, such as a performance analyzer, may also be used to determine activity type by analyzing data behavior along with other information gained during other performance analyzer use. This information may be used in conjunction with the rebuild engine 555 to skew the utilization rate to account for particular data behavior. For example, a RAID group experiencing a higher percentage of read requests may have its utilization metrics skewed lower to account for the lower wear rate associate with read operations. Conversely, a RAID group experiencing a higher percentage of write requests may have its utilization metrics skewed higher to account for the higher wear rate associate with read operations.

Alternatively, or in addition, utilization metrics may be skewed based on a read/write ratio based a particular application or application type where the application or application type is known or determined to produce a particular read/write pattern. For example, RAID groups storing data for particular applications identified as having higher wear rates (i.e., higher write ratios) may have their utilization metrics skewed higher, whereas applications identified as having lower wear rates (i.e., lower write ratios) may have their utilization metrics skewed lower. Alternatively, the more important data may be directed to the higher performing storage unit using techniques described herein whereas the less important data may be processed according to conventional techniques.

Continuing to refer to FIG. 6, as mentioned above, the technique determines various drive status information for each flash drive in the RAID group 537, 539 and flash drives in the spare drive pool 560. For example, the wear determination unit 530 is configured to determine, for each drive, a metric that indicates how much of the drives total lifetime write count has been utilized, expressed as a percentage. Thus, a flash drive having a metric of 68% has used up 68% of the drive's total rated write cycles. That is, if the drive is rated for 100,000 write cycles, the drive would have used 68,000 of the 100,000 writes and, consequently, have 32% or 32,000 write cycles remaining before the drive could be expected to fail. A similar determination is made for some or all of the remaining flash drives including both the RAID 537 539 group drives and the spare drives 560 with example percentage utilization rates shown for each drive.

Once a drive fails or is identified as reaching 100% utilization rate, the flash drive need to be replace. For example, RAID group 2 539 shows a flash drive having reach 100% and needs to be replaced to avoid potential data loss should another drive fail. The rebuild engine 555 will analyze wear metrics such as the utilization rates for the one or more flash drives in the RAID group 539 and select a spare flash drive from the pool of spare drives 560 having a particular wear metric. For instance, the rebuild engine 555 may average the wear or utilization rates of the flash drives, which in this case is the average of 32%, 57% 43% and 53% which equals 46.25%. Scanning the available pool of spare flash drives, the closest drive with a similar utilization rate is the drive at 46%. Thus, if the spare drive selection policy was enabled to select a drive with a similar utilization rate, such a drive would be selected. Other policy selections may be enabled including selecting a spare with a higher or lower utilization rate based on one or more criteria described elsewhere herein.

Alternatively, or in addition, a drive replacement indicator, such as a message to an administrator or user interface alert, may be generated to allow for a scheduled replacement of the drive. The utilization rate at which such indicator gets generated may be the same, less than, or greater than the utilization rate that is used to reassign a drive to RAID group 539. Alternatively, or in addition, a list of one or more candidate spare SSDs may be provided to the user where the user can select one from among the list at which point, the technique completes the rebuild procedure and updated the status of flash drives in the spare drive pool 560.

Although current techniques are described in conjunction with RAID groups 537, 539 having high endurance and a medium endurance flash drives, this should not be construed as a limitation as the techniques are similarly applicable to multiple other RAID groups and multiple RAID group classes or types including, but not limited to, groups having low endurance flash drives and read intensive flash drives.

It should be noted that an embodiment may use sub-tier categorization techniques described herein with a flash drive that performs writes to a group or portion of cells of the device, such as a block of cells. Thus, when writing to the flash drive, a number of writes may be performed at a time in accordance with a number of cells in each block. For example, a write operation to store new data to a flash drive may write to a block of cells in which each block stores 128 kB (kilobytes) of data so that a single erase and write sequence of operations may be performed to write 128 kB of data as a unit to the block.

FIG. 6 illustrates a flowchart of an example embodiment employing the techniques described herein. While various methods disclosed herein are shown in relation to a flowchart or flowcharts, it should be noted that any ordering of method steps implied by such flowcharts or the description thereof is not to be construed as limiting the method to performing the steps in that order. Rather, the various steps of each of the methods disclosed herein can be performed in any of a variety of sequences. In addition, as the illustrated flowcharts are merely exemplary embodiments, various other methods that include additional steps or include fewer steps than illustrated are also within the scope of the present invention. Further, FIG. 6 will be described in conjunction with the system illustrated in FIGS. 5 and/or 6.

As shown, the method can begin with a step S100. The method can be initiated manually by a user, for example by entering a command in a command-line-interface or by clicking on a button or other object in a GUI. The method can also be initiated automatically by storage management software and/or can be scheduled to run automatically at certain dates and times. Execution of the method can also be based on various user-specified constraints. For example, a user can specify the method run continuously or until a particular flash drive wear level across the flash drives is within a particular parameter.

The method may further include a step S102 where multiple flash drives are arranged in a group, such as RAID group configurations 537, 539. The RAID group flash drives can be a variety of flash drive types or classes as shown. The groups may be configured and/or identified based on user input, or may be determined automatically via system software. In step S104, a wear metric or indicator based on, for example, write utilization or erasure counts may be determined for one or more flash drives comprising the RAID groups. The wear indicator may be monitored periodically, aperiodically, or continuously. Such results may be stored in a wear indicator map.

In step S106, spare flash drives 560 may be identified, classified, and/or tagged based on one or more wear metrics. The spare flash drives may be classified based on type (e.g., high, low, medium endurance, read intensive endurance and or SLC, MLC, and the like). A list of spares ranked according to a parameter such as wear utilization may be generated and may be further subdivided based on drive type/class. In step S108, a wear metric or indicator based on, for example, write utilization or erasure counts may be determined for one or flash drives identified and/or configured as spare flash drives such as those in the spare drives pool 560. The wear indicator may be monitored periodically, aperiodically, or continuously. Such results may also be stored in a wear indicator map.

In step S110, a RAID group flash drive is identified as needing to be replaced. This may occur when a flash drive fails unexpectedly. Alternatively, by monitoring the wear rate of the RAID group flash drives, a drive that is approaching or has surpassed its 100% utilization rate can be identified or flagged for replacement, either essentially immediately or at a scheduled maintenance period.

In step S112, the technique examines the list of spare drives and selects a spare drive based on one or more metrics. For example, the remaining working flash drives in RAID group 2 539 have an average utilization rate of 43%. If the rebuild engine selection policy is to maintain a RAID group with approximately average utilization rates, a spare drive close to the 43% average will be selected. In step S114, the rebuild engine 555 may initiate a rebuild procedure using the spare drive that was selected based on a particular wear metric. The process may end at step S114, or alternatively, repeatedly continue again at step S104 as necessary.

It should be noted that although an initial storage system may arrange and configure RAID group flash drive of the same class/type, potential spare flash drives need not be of the same class. This is because the technique takes into account flash drive class/type when determining utilization rates of potential spare flash drives. Thus, a flash drive in a RAID group originally configured with all high endurance flash drives can be replace with, for example, a low endurance drive and both the high and low endurance flash drives can be expected to reach an EOL at about the same time.

Current maintenance practice is to maintain 1 drive for every 30 system drives. If a system has 4 different class flash drives, conventional practice dictates that 4 drives for every 30 drive be available—one for each class. Advantageously, the current technique provided the ability to allow a spare flash drives of one class to be used in a RAID group having flash drives of a different class. As a result, the number of spares required can be reduced.

It will be appreciated that an embodiment may implement the technique herein using code executed by a computer processor. For example, an embodiment may implement the technique herein using code which is executed by a processor of the data storage system. As will be appreciated by those skilled in the art, the code may be stored on the data storage system on any one of a computer-readable medium having any one of a variety of different forms including volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, (DVD) or other optical storage, magnetic cassettes, magnetic tape, magnetic disk storage or other magnetic storage devices, or any other medium which can be used to store the desired information and which can accessed by a data storage system processor.

While various embodiments of the present disclosure have been particularly shown and described, it will be understood by those skilled in the art that various changes in form and details may be made therein without departing from the spirit and scope of the present disclosure as defined by the appended claims.

What is claimed is:

1. A method for use in managing data in a data storage system, the method comprising:
configuring, in the data storage system, a pool of storage devices, wherein the pool includes flash drives of performance characteristics;
associating each flash drive with one category of a plurality of categories wherein each category of the plurality of categories corresponds to performance characteristics of the flash drive;
selecting a first set of flash drives from the pool of storage devices, wherein each flash drive in the first set is selected from a same category;
arranging the first set of flash drives in a redundant array of independent disks (RAID) group;
determining a wear indicator of each flash drive in the first set of flash drives;
configuring a plurality of flash drives, from the pool of storage devices not selected in the first set, as a second set of flash drives, wherein the second set of flash drives is configured as spare flash drives;
associating each flash drive in the second set of flash drives with one category of the plurality of categories wherein each category corresponds to performance characteristics of the flash drive in the second set of flash drives;
determining a wear metric of each flash drive in the second set of flash drives;
identifying a first flash drive in the first set of flash drives that is to be replaced;
upon identifying the first flash drive that is to be replaced, selecting an appropriate spare flash drive from the second set of flash drives to replace the first flash drive by examining the wear metric of each flash drive in the second set of flash drives, wherein the appropriate spare flash drive is selected for the same category as the flash drive to be replaced and based on a comparison of the wear metric of each flash drive in the second set of flash drives with a wear indicator associated with the first flash drive that is to be replaced; and
initiating a rebuild process wherein the first flash drive is replaced with the selected spare flash drive.

2. The method of claim 1, wherein the first set of flash drives is a first class of flash drives and the selected spare flash drive is a second different type of flash class.

3. The method of claim 1, wherein the wear metric is a wear utilization rate.

4. The method of claim 1, wherein the wear indicator associated with the first flash drive is an average wear utilization rate for the first set of flash drives.

5. The method of claim 1, wherein the wear metric is a time parameter representing a time period until a flash drive reaches a predetermined end of life specification.

* * * * *